May 1, 1962    R. D. BARRETT    3,032,352
TRACTOR VEHICLE WEIGHTING MEANS
Filed Nov. 3, 1958    3 Sheets-Sheet 1
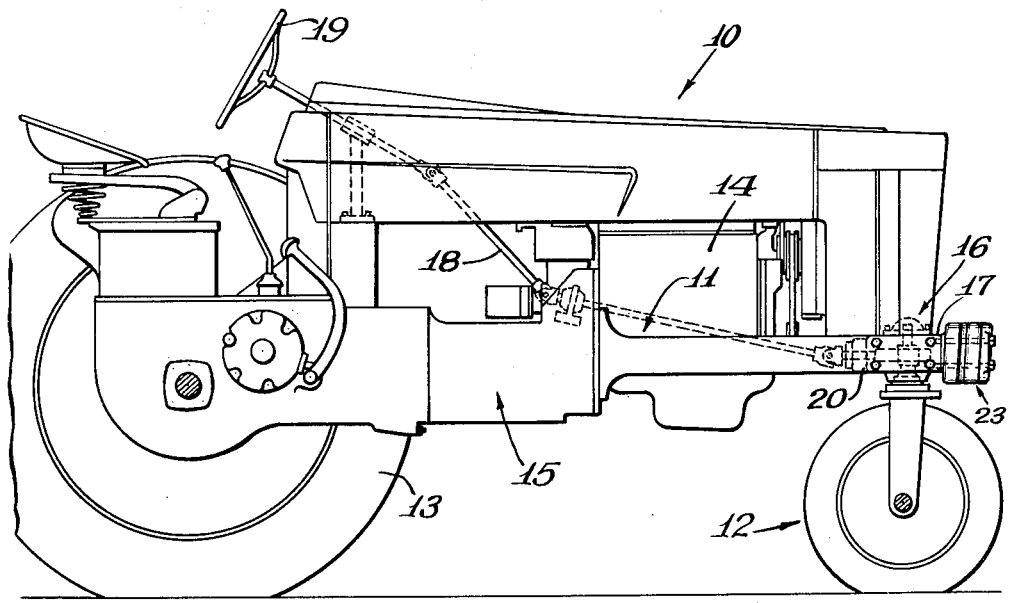
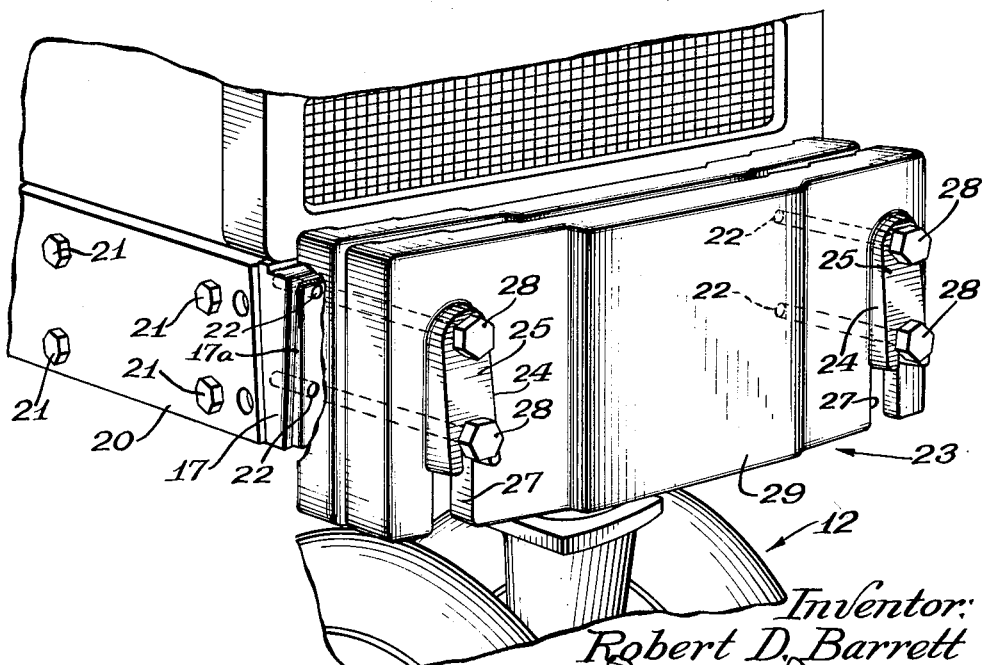
Inventor:
Robert D. Barrett
Atty.

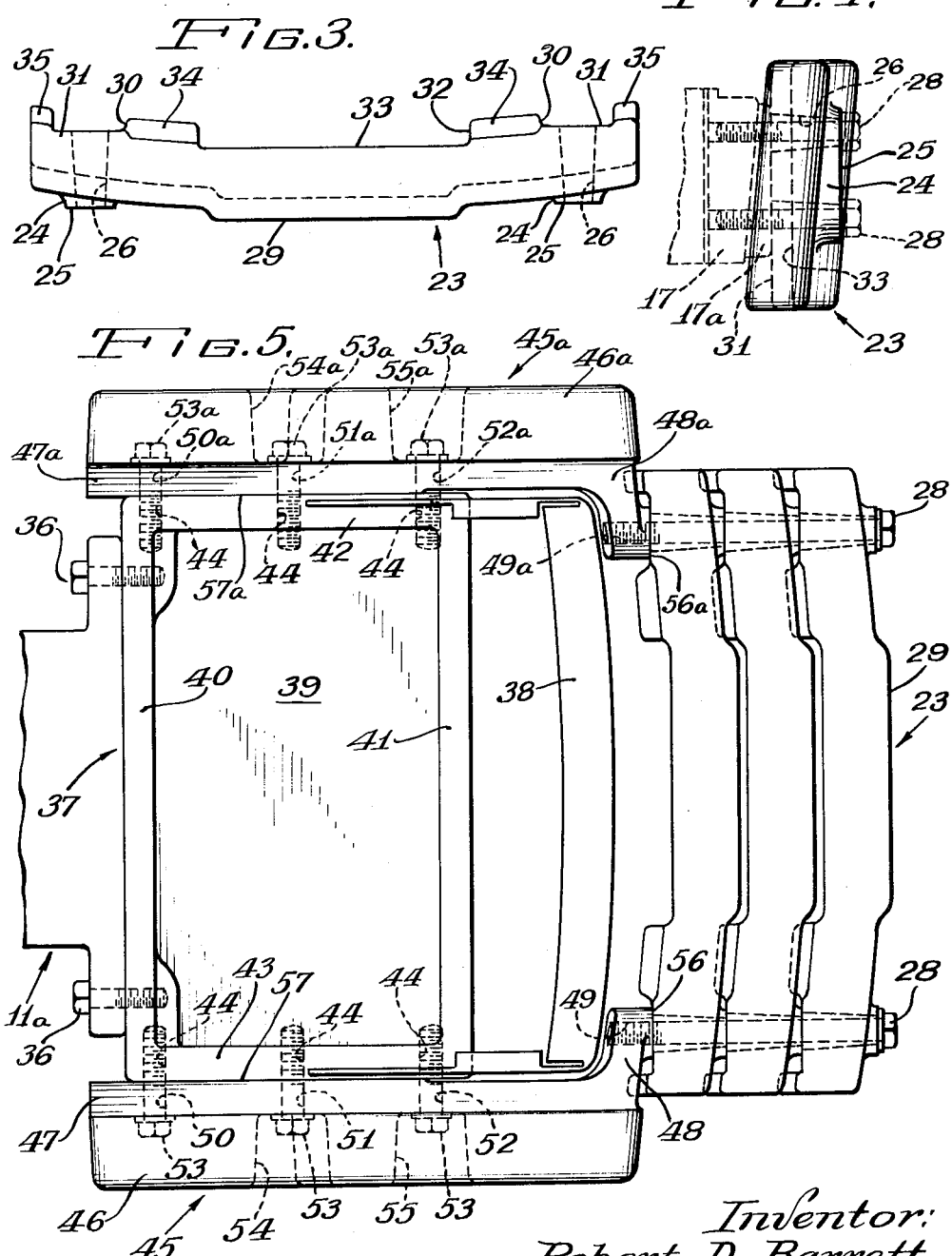

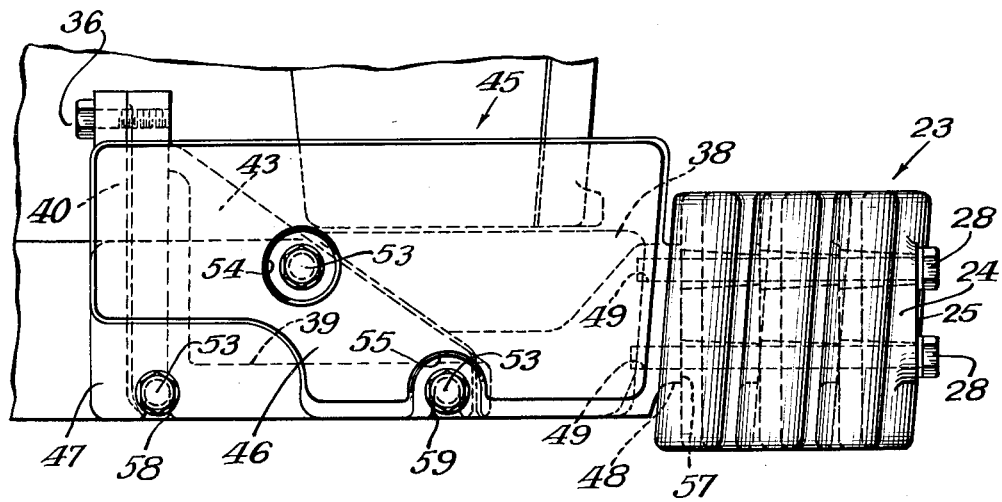
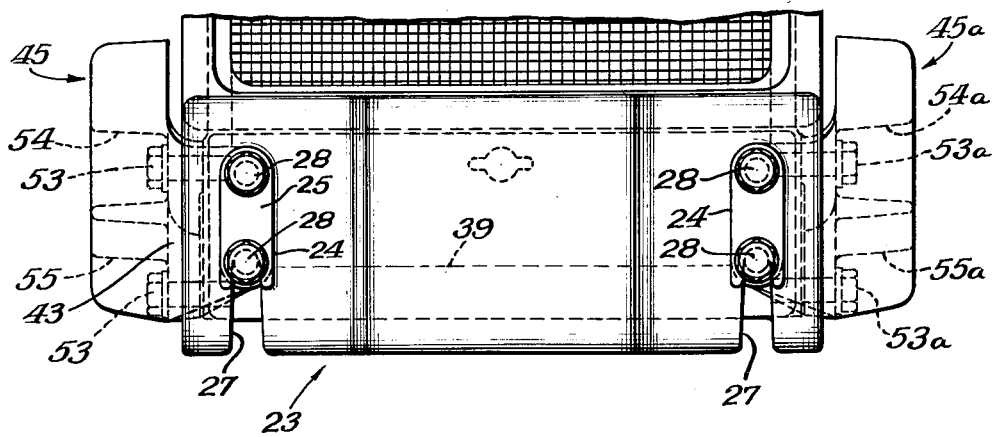

United States Patent Office 3,032,352
Patented May 1, 1962

3,032,352
TRACTOR VEHICLE WEIGHTING MEANS
Robert D. Barrett, Westchester, Ill., assignor to International Harvester Company, Chicago, Ill., a corporation of New Jersey
Filed Nov. 3, 1958, Ser. No. 771,326
4 Claims. (Cl. 280—150)

This invention relates to counterweighting means, and is more particularly applicable to tractor vehicles that have earth-working equipment attached to or mounted thereon and adapted for use in coaction with the vehicle.

In the use of tractor vehicles, particularly for farming or other earth-working purposes, it is customary to attach or mount the farming tools and earth-working equipment either to the rear end portion of the vehicle or to the framework thereof somewhere between the front and rear wheels of the vehicle. In line with this practice it is also customary to add detachable or removable ballast weights to the vehicle, so as to provide either for additional traction therefor or to provide added steering stability for the vehicle, according to the demands of the particular operation. The supplemental weighting means provided in the past have taken various forms, but even the best and most generally accepted of these different means regardless of the purpose for which they were used, has never been entirely satisfactory primarily because the individual weight units were heavy, cumbersome and the attaching means available made them too difficult or awkward for the average worker to handle without assistance.

It will be appreciated, of course, that in order to obtain the maximum steering stability or positive steering effect where rear mounted tools or equipment are used, such supplemental weights are best attached at the forward portion of the vehicle and, heretofore, this was found to be a most desirable and frequently used location, although the practise of attaching additional weights to the tractor wheels of the vehicle also continues to be a popular and commonly employed expedient for traction increasing purposes.

An example of a prior art device of the particular character dealt with herein may be found in the U.S. Patent 2,797,121 issued June 25, 1957 to R. P. Aud for a Combined Hold-Down Weight and Bumper Guard for Tractors.

The present invention, primarily, is concerned with providing detachable weighting means which are not encumbered with the handicaps and shortcomings of the better known similar devices of the prior art, and which are particularly applicable to a portion of the vehicle other than the wheels, and to further providing a method for attaching and removing such supplemental individual unit weights to and from a vehicle.

An important feature, which constitutes a primary object of the invention, therefore, is to provide an improved, easily handled weighting unit that may readily be attached to or detached from a vehicle, such as a tractor or the like.

Another important object is to provide an improved, simplified and easily executed or manipulated method for attaching and detaching individual weight units to a vehicle.

Another object is to provide a counterweight unit so constructed that a plurality of such units may be arranged or assembled in nesting fashion and mounted on a vehicle by common fastening means which individually supports each of said units thereon.

A further important object is to provide a weighting unit having means associated therewith for initially or temporarily aiding in the support of such unit during the time it is in the process of being attached to or removed from a vehicle.

A still further object is to provide a weight unit having means fashioned therein adaptable for aiding in providing for supplementary support of the unit on a vehicle, which means is separate or independent of a means fashioned therein and used for aiding in the providing of initial or temporary support thereof.

A yet still further object is to provide an improved, facile and easily manipulated method for attaching and detaching one or more individual weight units to or from a vehicle, which method requires the manual handling of only one such weight unit at a time.

The present invention includes the novel constructions, arrangements and devices that will subsequently be described and claimed for accomplishing the above noted objects together and such other objects as will be apparent from the following description of some preferred embodiments of the invention, as illustrated, with reference to the accompanying drawings, in which:

FIGURE 1 is a side elevational view, with the wheels nearest the viewer removed, of a tractor vehicle to which the present invention has been applied;

FIGURE 2 is a fragmentary perspective view, with a portion thereof shown broken away, of the front end of the vehicle depicted in FIGURE 1 and clearly shows an assembly of the proposed weighting units attached thereto;

FIGURE 3 is a top plan view of an individual weighting unit according to the invention;

FIGURE 4 is a side elevational view of the proposed weighting unit and shown with portions of the vehicle frame bolster and fastening means indicated in broken lines;

FIGURE 5 is a fragmentary top plan view of a portion of the forward end of a tractor vehicle frame and shows a modified means for supportably mounting the proposed weighting units thereon;

FIGURE 6 is a side elevational view of portions of the structure shown in FIGURE 5; and FIGURE 7 is a front elevational view of portions of the structure shown in FIGURES 5 and 6.

Referring now to the drawings, it will be noted that the tractor vehicle which has been selected for illustrating one preferred form or embodied application of the present invention, and designated generally by the reference character 10, is of conventional design, and includes a longitudinally extending frame or chassis 11, a steerable front wheel assembly 12, and a pair of spaced rear traction wheels 13 (only one of which is shown) driven by means of a driving engine 14 connectable thereto through a conventional change-speed transmission and final drive unit, indicated in its entirety by the numeral 15. Other components and details, illustrated only to show their general relationship to the vehicle, have not been designated with unit reference numerals inasmuch as such details are not essential to the inventive concepts hereof and to do so might tend to make the drawings unnecessarily complex.

The steerable front wheel assembly illustrated herein is of the well-known dirigible or tricycle type that utilizes a pair of slightly spaced inwardly inclined or cambered wheels (only one of which is shown) mounted on a suitable unitary operated support means, although the use of a single steerable front wheel or a pair of widely spaced front wheels is also envisaged as being well within the scope of the teachings of the present invention. Said steerable front wheel assembly will be seen to include a drive-transmitting or steering-gear mechanism, indicated generally by the numeral 16, that is mounted in a bolster portion 17 of the frame 11 and which connects by way of the steering control column 18 with an operator's steering wheel 19.

The bolster member 17, preferably, is fashioned as a unitary structure that extends between the forward side rails or channel portions 20 of the vehicle chassis or frame 11, and is suitably secured thereto such as by the bolt means indicated at 21, and functions as a transverse structural member for the forward portion of the frame as well as providing a support means for the steerable wheel assembly and its associated drive-transmitting gear mechanism 16. The forward portion of the bolster 17 is disposed so as to project or extend forwardly beyond and overlie the ends of the frame side rails 20 and is fashioned with a pair of transversely spaced rib-like seating projecting 17a, 17a, each of which has a pair of vertically spaced-apart threaded openings 22 (only two of which are shown in FIGURE 2) extending therethrough, which seatingly receive the weighting units as will presently be explained. The disposition of said openings although illustrated as being positioned at the four corners of a rectangle may be otherwise disposed, if desired, without deviating from any of the teachings hereof.

In accordance with the more specific teachings of the present invention a weight unit, indicated generally by the reference numeral 23, is fashioned, preferably, as a unitary body member and shaped generally rectangular and oblong as indicated in the various views of the drawings. The longitudinal dimension of the unit may be formed with a slightly curved or arched configuration so as to generally conform with the curvature of the forward surface of the bolster member 17. The forward or front face of the body of the weight 23 has provided thereon a pair of horizontally spaced vertically extending and outwardly projecting boss-like rib members 24, 24, the outwardly facing vertical surfaces of which are fashioned to provide flat face seating portions 25, 25 which are normally positioned with respect to a pair of openings 26, 26, one of which extends through each rib and through said weight unit. In vertical alignment with each of said openings and spaced therefrom there is provided a slotted recess 27 which extends inwardly from the lower edge of the weight 23 and continues on into a portion of each projecting rib member 24 and the inner end of which parallels the openings 26, 26. The openings 26, 26 and slotted recesses 27, 27 are so disposed as to cooperatively accommodate parallel extending long shanked bolts, such as shown by the numeral 28, which are threadably insertable into the respective openings 22 in the frame bolster 17 to provide adjustable and detachable fastening means, as will be further explained. An outwardly extending or raised rib portion 29, centrally disposed on the outside or front face of the weight 23, provides means to facilitate the nesting alignment of these weight units when two or more such units are employed together in a juxtaposed relation, or for stacking and storing purposes.

The back or rear face of the body of the weight unit 23 has formed therein a pair of vertically extending wide slots or channels 30, 30, disposed in generally parallel and spaced alignment with the respective front face rib members 24, 24, and fashioned with a non-uniform depth of channel, as will be readily discernible from FIGURE 4, so that the floor surfaces 31, 31 thereof parallel the flat face seating surface portions 25, 25 of the respective front rib members, while at the same time being normally positioned with respect to the openings 26, 26 through the unit. Another wide slot, shallow channel-like recess or depressed area 32 in the rear face of said weight unit extends vertically therewithin and is disposed centrally of the side edges of the unit. Although the floor surface 33 of said latter channel is relatively uniform in depth, as illustrated, it will be appreciated that it could be otherwise formed without deviating from any of the teachings hereof. As thus constituted the back face of the weight unit may be said to be formed with the slots 31, 30 and 31 separated by the respective rib members 34, 34, while the ribs 35, 35 delimit the outer edges of the slots 31, 31. While the weight unit 23 is shown as being fashioned as a unitary structure, this being the preferred and simplified way of fabrication, it will be appreciated that the unit could be formed using a central body member and fixedly securing suitable rib members thereto to provide the desired structural conformation without deviating from any of the inventive concepts hereof.

The method proposed for attaching one or more of the presently proposed weighting units to the vehicle constitutes, of course, one of the important features of the present invention because it offers a safe and simplified procedure for adding the supplemental weights without requiring the exercise of great skill, unusual manual dexterity or the application of substantial muscular effort on the part of the individual affixing one or more of such weights to a vehicle. To accomplish such an operation the two lower bolts 28, 28 are first threadably inserted into the respective threaded openings 22, 22, in the bolster 17, a distance depending upon the length of the bolts selected and upon the total number of such weight units to be added. Next a weight unit 23 is lifted into position, so that the slots 27, 27 therein each straddle a shank of the respective bolts 28, 28, and then lowered until the top of each slot engages a bolt shank, whereupon the weight of the weighting unit is initially or temporarily carried by the fastening means provided by said lower bolts. If no further or additional weight units are to be added the instant weighting unit is then fixedly secured or fastened. To do this the two top or upper bolts 28, 28, which function as part of a supplementary fastening means, are inserted through the respective openings 26, 26 and threaded into the aligned threaded openings 22, 22 in the bolster 17 and then pulled up tight. When these two top bolts have been tightened down, so that the seating faces of the bolster ribs 17a, 17a are tightly engaged in abutting relation with the cooperating floor surfaces 31, 31 of the slots 30, 30, and the heads of said upper bolts are tightly seated against the flat faced seating portions 25, 25 of the respective ribs 24, 24, one portion of the units fastening means becomes operative for providing a supplementary means for supportably mounting said weight unit. Next the two lower bolts 28, 28, which heretofore have functioned as an initial or temporary fastening means, are pulled up tight and these lower bolts then provide a fastening means which cooperates with the other fastening means to provide a combined means for supportably mounting said weight unit in a fixedly secured position.

In the event more than one weight unit is to be added the additional weights are each successively lifted individually into position with their slots 27 straddling the respective shanks of the lower bolts 28 before the upper bolts 28 have been inserted. Then when all the desired weight units that are to be added have been so positioned adjacent one another and initially supported on said lower bolts, the upper bolts 28 are inserted and tightened up as in the case of only one weight unit. Finally, with the upper bolts tightened the lower bolts may then be easily pulled up into tight relationship. It will now be evident that when a plurality of such weighting units are disposed adjacent one another in nesting or stacking fashion the flat face seating surface portions 25, 25 of the ribs 24, 24 of one unit fit into the slots 30, 30 of the reverse face of the adjacent unit and rest in close fitting relationship against the flat floor surfaces 31, 31 of the respective slots. At the same time the central raised member or rib 29 of one unit readily nests in the depressed area or wide slot 32 of an adjacent unit without interference therebetween and as thus arranged a plurality of such units will occupy a minimum of space. Furthermore, the assembly is quite rigid and will not chatter or work loose while the vehicle is in operation. Since it is not necessary for the installer to hold or balance a weight unit in one hand while a supporting bolt is inserted with the other hand it will be appreciated that the whole procedure for attaching such weights is greatly simplified and can be carried out without great muscular effort or balancing dexterity.

In the event it becomes desirable to add further additional weights after it has been found that the number of weights previously attached is insufficient, the additional weights may readily and easily be added without removing or actually handling the previously attached weights. This may be accomplished in the hereinafter described manner. First the lower bolts 28 are removed and replaced with longer bolts, depending on the number of extra weights to be added, but the upper bolts 28 are not loosened until the longer lower bolts 28 are threadably inserted into the bolster 17. During this transition the initially installed upper bolts 28 may act as a temporary holding means for the previously attached weights, thereby eliminating the need for any further handling of said prior installed weights in order to add the additional weights. Next, and after the longer lower bolts 28 have been attached to the bolster 17, the shorter upper bolts 28 are removed, whereupon the extra weights are temporarily supported on the longer lower bolts 28 while the new and longer upper bolts 28 are installed and subsequently pulled up tight. Finally with the new and longer upper bolts tightened the longer lower bolts may then be easily pulled up into tight fitting relationship. Some of the tractor vehicles presently in commercial use are not equipped with the particular frame bolster member heretofore shown and described and hence the proposed supplemental ballast weights cannot be supportably affixed to such vehicles in the identical manner as was described in the preceding paragraphs. In FIGURES 5, 6 and 7, however, there is illustrated a modized attaching or affixing means which, as shown, is readily adaptable for supportably mounting weighting units of the character proposed on various types of tractor vehicles. In FIGURE 5 there is depicted a fragmentary plan view of the forward end of a generally conventional tractor vehicle frame, represented generally by the reference numeral 11a, to which there has been suitably affixed, as by the bolt means 36, a bolster structure member, indicated generally at 37, while a decorative cover plate 38 is suitably positioned around the forward portion of said bolster. The bolster 37 is fashioned, preferably, as a unitary structure having a body or floor portion 39 and upstanding transverse wall or web members 40, 41 and lateral wall or web members 42, 43, and having a plurality of tapped openings 44 in said lateral web members. The adapter bracket members 45, 45a, one of which is adapted for affixment to the right-hand side and one to the left-hand side of the bolster 37 being otherwise identical it was felt necessary to describe only one thereof in detail in order to obtain a proper understanding of its structure, the opposite member being indicated with the same reference numerals plus the suffix a. These brackets, while functioning as adapters or means for affixing one or more of the proposed weighting units to a vehicle, are also adaptable as weighting units themselves and may be fashioned for either use without deviating from any of the inventive concepts hereof. As constituted each such bracket includes a longitudinally extending and vertically disposed body portion 46 having a raised ridge-like extension or projection 47 along the inner or vehicle side thereof. The forward end of said raised extension projects beyond the forward edge of said body portion and is turned or bent over to form a bracket arm, as shown at 48, provided with vertically spaced-apart tapped openings 49 dimensioned and spaced for alignment with a co-operating opening and slot in the weighting unit, and which extends transversely in front of the bolster member 37. Openings 50, 51 and 52 in the raised rib member 47 are provided to accommodate bolt means, such as shown at 53, which are used to affix the respective bracket, by way of the tapped openings 44, to the bolster member 37.

Two of said bolts 53 may have the heads thereof received in countersunk openings 54 and 55 in the body portion 46 of said bracket thus permitting the use of bolts of uniform length. The face of the forward vertical surface of the bracket arms 48 is finished flat and is normally disposed with respect to the openings in said arm so as to provide a seating or abutment surface 56 against which the flat floor surface 31, of a respective slot 30 in the weighting unit, may be tightly positioned. The inner or vehicle side vertical surface of the extension portion 47 of said bracket is also finished relatively flat and is normally disposed with respect to the openings 50, 51 and 52 therethrough so as to provide a seating or abutment surface 57 adaptable for tightly engaging the bolster member 37 when the attaching bolts 53 have been pulled up tight. If desired, the openings 50 and 52 may be slotted, as best seen in FIGURE 6 at 58 and 59, to facilitate positioning and affixment of the adapter bracket to the bolster member.

After the adapter brackets 45, 45a are affixed and tightly positioned against the respective portions of the bolster member 37 by the bolts 53, 53a the individual weighting units 23 are then mounted using the procedure heretofore outlined except that the bolts 28 are in this instance threadably inserted into the respective threaded openings 49 in the bracket arms 48, 48a instead of directly into the threaded openings in the bolster member. With the lower bolts 28 threaded part way into the bracket arms 48, 48a the succeeding steps for mounting the ballast weights are identical with those previously outlined.

From the above it will be evident that the proposed invention provides an improved form of weight unit together with an improved means for affixing one or more of such units to a vehicle. It also provides an improved, simplified and easily manipulated method for attaching supplemental ballast weights to a vehicle. It is to be understood that changes may be made in the construction without departing from the spirit of the invention or the scope thereof as defined in the appended claims.

What is claimed is:

1. A weighting attachment for a tractor, comprising: a weighting member having oppositely facing forward and rearward surfaces with a plurality of openings and a plurality of slot-like recesses extending between said surfaces and arranged so that said openings are spaced vertically above said recesses; said member being further fashioned so that each of said recesses has one end thereof opening at the bottom edge of the member and having an upper inner end thereof that is disposed parallel to said plurality of member openings; and a plurality of separate detachable means adjustably affixable to the tractor and extending through said member and respectively cooperative with said openings and said recesses for supportably and securely mounting said member on the tractor; and having each of said means fashioned and arranged so as to be alternatively effective independently of the other of said means or as a supplement to one another for securely affixing said member to the tractor.

2. A weighting attachment for a tractor, comprising: a weighting member having oppositely facing surfaces with a plurality of openings and a plurality of slot-like recesses extending between said surfaces; and said member being further fashioned and arranged so that each of said recesses has one end thereof opening at the bottom edge of the member and having an upper inner end thereof that is disposed parallel to and spaced vertically below said plurality of openings; first detachable means extending through said member and cooperative with said plurality of slot-like recesses and adjustably affixable to the tractor for initially supportably mounting said member on the tractor; and second detachable means extending through said member and adjustably affixable to the tractor and disposed in parallel relationship to said first means and cooperative with said plurality of openings for supportably mounting said member on the tractor;

said first and second means being fashioned and arranged so that they may be alternatively effective independently of one another or cooperatively with one another for fixedly securing said weighing member to the tractor.

3. A weighting attachment for a tractor, comprising: a weighting member having oppositely facing vertical surfaces with a plurality of openings and a plurality of slot-like recesses extending between said surfaces; said member being further fashioned and arranged so that each of said recesses has one end thereof opening at the bottom edge of the member and having an upper inner end thereof that is disposed parallel to and spaced vertically below said plurality of openings; first detachable means including bolts threadably mounted in said tractor and cooperatively positionable to extend through said member and within a respective one of said plurality of slot-like recesses for initially supportably mounting said member on the forward end of the tractor; and second detachable means including bolts threadably mounted in said tractor and disposed in parallel relationship to said first means and cooperatively insertable through a respective one of said plurality of openings for providing an additional support for fixedly mounting said member on the tractor; said first and second means being fashioned and arranged so that they may be alternatively effective independently of one another or as a supplement to one another for fixedly securing said weighting member to the tractor.

4. A weighting attachment for a tractor, comprising: a weighting member having oppositely facing vertical surfaces with a plurality of openings and a plurality of slot-like recesses extending between said surfaces; said member being further fashioned and arranged so that each of said recesses has one end thereof opening at the bottom edge of the member and having an upper inner end thereof that is disposed parallel to and spaced vertically below said plurality of openings; a pair of brackets detachably affixed one on either side of the forward end of said tractor, and arranged with each of said brackets having an arm extending transversely in front of said tractor; first fastening means threadably mounted one each in said bracket arms and extending through said member and cooperatively positionable within a respective one of said plurality of slot-like recesses for initially supportably mounting said member on the tractor; and second fastening means threadably mounted one each in said bracket arms and disposed in parallel relationship relative to said first means and cooperatively insertable through a respective one of said plurality of openings for providing another support for securely mounting said member on the tractor; said first and second fastening means being fashioned and arranged so that they may be alternatively effective independently of one another or in addition to one another for fixedly securely mounting said member on the tractor.

References Cited in the file of this patent

UNITED STATES PATENTS

| | | |
|---|---|---|
| 1,277,434 | Leadbeater | Sept. 3, 1918 |
| 2,003,599 | Le Tourneau | June 4, 1935 |
| 2,178,367 | Dunham | Oct. 31, 1939 |
| 2,325,089 | Zeilman | July 27, 1943 |
| 2,368,121 | Dunham | Jan. 30, 1945 |
| 2,409,516 | Rosenthal et al. | Oct. 15, 1946 |
| 2,701,728 | Miller | Feb. 8, 1955 |
| 2,722,320 | Dobeus et al. | Nov. 1, 1955 |
| 2,841,452 | Borgman et al. | July 1, 1958 |
| 2,856,706 | Hacker | Oct. 21, 1958 |